J. S. STOKES.
PRODUCTION OF BOXES.
APPLICATION FILED DEC. 6, 1917.

1,355,924.

Patented Oct. 19, 1920.
2 SHEETS—SHEET 1.

Inventor,
John S. Stokes.
By his Attorneys,
Meyers, Cushman &co

J. S. STOKES.
PRODUCTION OF BOXES.
APPLICATION FILED DEC. 6, 1917.
1,355,924.
Patented Oct. 19, 1920.
2 SHEETS—SHEET 2.
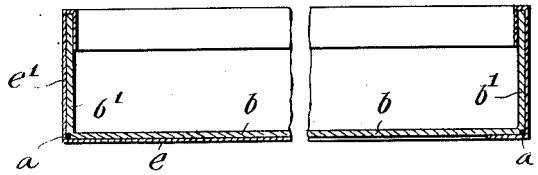
Fig. 7. Fig. 7.a
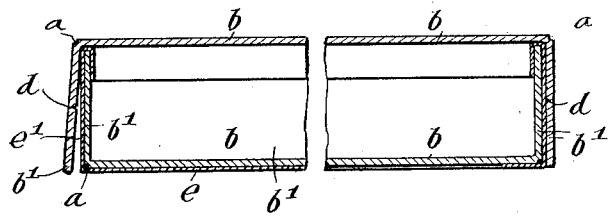
Fig. 8. Fig. 8.a
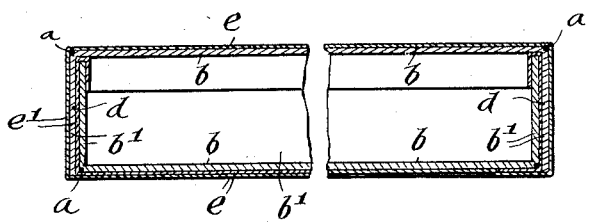
Fig. 9. Fig. 9.a
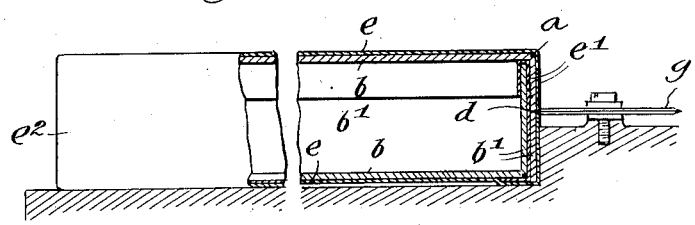
Fig. 10.
Inventor,
John S. Stokes.
By his Attorneys,
Meyers, Cushman & Rea

UNITED STATES PATENT OFFICE.

JOHN STOGDELL STOKES, OF MOORESTOWN, NEW JERSEY, ASSIGNOR TO STOKES & SMITH COMPANY, OF PHILADELPHIA, PENNSYLVANIA, A CORPORATION OF PENNSYLVANIA.

PRODUCTION OF BOXES.

1,355,924.  Specification of Letters Patent.  Patented Oct. 19, 1920.

Application filed December 6, 1917. Serial No. 205,850.

*To all whom it may concern:*

Be it known that I, JOHN STOGDELL STOKES, a citizen of the United States, residing at Moorestown, in the county of Burlington and State of New Jersey, have invented new and useful Improvements in Production of Boxes, of which the following is a specification.

This invention relates to boxes of the neck or shoulder type and to the production of the same.

Boxes of this type are generally of two forms—one having the cover hinged, the other having it removable. Various methods have been employed in the production of such boxes, the methods being more or less dependent on the ability to manufacture the boxes under high capacity operations in order that the cost of manufacture may be reduced as far as possible. The developments of apparatus designed for providing such operations has been more or less difficult, due to certain requirements inherent in the form of this type of box, and while certain apparatus developments have been made with a view to such production, the methods of production have been such as to necessitate the use of complicated and costly apparatus in the form of special machines designed solely for such production. As a result, the cost of production is materially increased by reason of the cost of the apparatus and the inability to employ the machines for other uses, thereby restricting the earning capacity of the apparatus to this type of box construction. Where attempts have been made to provide boxes of this type manually, the cost has also been high because of the labor cost involved.

This requirement for the use of special and complicated machines is due more or less to the particular structural formation of the box itself, a structure which practically necessitates the use of such special machines or production by providing the major portion of the operation by manual labor.

The present invention is designed to meet these conditions in such manner as to permit the use of standard machines—capable of use in the production of boxes, etc., of other types—thereby enabling boxes of this type to be economically and efficiently produced without material additional capital outlay in the form of new machinery. As a result the production of this type of box need not be limited to a small number of manufacturers, thus opening up this particular branch of box manufacture to competition through the use of standard machines, expanding production without the risk attendant on large capital outlays for special machines.

This use of standard machines is made possible by the fact that it has been found practicable to produce a serviceable box of this type by so changing the manner of connection of box elements as to practically eliminate certain structural requirements heretofore considered essential (the presence of which rendered production on standard machines practically impossible), substituting therefor other structural formations which would permit the production to be had on standard machines. For instance, one of the essentials heretofore required is that the two plies of the box body below the neck or shoulder must be adhesively connected, thus making these plies the equivalent of an integral structure, incidentally preventing relative movement between the plies in the direction of box depth. The necessity for properly positioning these plies relative to each other in the presence of an adhesive coating during the positioning period made the operation one of considerable difficulty, requiring the use of special machines or the production mainly by manual manipulation. Other changes in general structural formation of the box were made as will be hereinafter indicated.

This particular change—the omission of the adhesive connection between the two plies of the box body—is made possible by arranging the box elements in a predetermined formation, and applying a wrapper blank—which may be of the label type if desired—in such manner that the plies are held from relative movement in the direction of box depth by the applied wrapper, the arrangement being such that the plies are free from direct adhesive connection. The wrapper providing an efficient substitute for this connection. Briefly stated, the general box formation for the purpose of production under these general conditions, is along the following lines:—

The box is formed from two box shells which are complementary to each other, each shell being made from a blank and having a plane wall and side walls whch extend laterally of the plane wall.

The two shells are adapted to be placed in telescoping relation, the plane wall of the inner shell forming the bottom wall of the box, the plane wall of the outer shell forming the top wall of the box, the two-ply side walls produced by the telescoping of the shells providing the side wall configuration of the completed box when treated as presently described.

Either or both of the shells may be stayed or stripped, as desired, or may be assembled in an unstayed condition. And in addition, the inner shell may, if desired, be covered by a suitable wrapper blank or by stripping, in order that the portion of the box body above the shoulder may have a more finished appearance.

If the box is to be of the hinge type, the outer shell preferably has that wall which is designed to carry the hinge, scored on the plane of the neck or shoulder of the box. And, if desired, the wings of this outer shell blank may be scored on the inner side of the blank, this scoring being on the line of the neck or shoulder, so that when, as presently explained, the box is completed by severing the desired number of side walls of the outer shell, the cutting tool need not pass entirely through the material of this side wall, thus avoiding liability of damaging the side wall of the inner shell or the wrapper or stripping which may be in position thereon. Where the box is of the hinge type, the hinge wall is not severed on such scoring line. Where the box is of the removable cover type, each of the side walls is severed in producing this type of box and these walls may have the scoring lines referred to. This scoring is advantageous, as indicated, but may obviously be omitted, if desired, excepting as may be required for hinge formation.

The box shells have the telescoped arrangement when assembled, although both shells may not be completely formed prior to assembly. For instance, the outer shell may, for reasons presently referred to, be of the unstayed type, in which case all of the wings would not necessarily fit the corresponding walls of the inner shell until the shell form is completed by being stayed or stripped, or by the application of the inclosing wrapper blank employed for the purpose of covering the box. It is not necessary that the outer shell have an individual cover premliminary to assembly.

A wrapper blank is applied to the two shells, this blank having a main portion and wings, the wings having a length in the direction of depth of the box greater than the corresponding length of the side walls of the box, so that if the main portion be applied to either the top or the bottom wall of the assembled box elements, these wings will extend over the several exposed side walls and on to the opposite plane wall of the box. The predetermined wings of the blanks are provided with end laps which are adapted to be secured to adjacent side walls of the outer shell, these laps being first applied, after which the wings for such side are applied on to these end laps. While not absolutely essential, it is preferred that one of the wings be increased in length to such an extent as to permit its excess portion to extend throughout the face of that wall opposite the wall to which the main portion of the blank is applied, this wing extension thus completing the wrapper application in such form as to entirely inclose the assembled shells. Since the wrapper blank is preferably all adhesively coated or striped, this application of the wrapper provides an integral connection between the bottom wall and the exposed side walls, the wrapper parts extending over the gap between these two parts, it being understood, of course, that the assembly of the two shells causes the bottom to be a part of one shell while the exposed side walls form parts of the other shell. Hence, this integral connection which extends across the gap, provides an efficient means for holding the bottom and exposed side walls from relative movement and obviously provides the same result between the two plies of the side walls, since the inner ply forms a part of the shell which carries the bottom wall. It has been found that this connection is sufficient to retain the side walls against relative movement in the direction of depth of the box without any adhesive connection between the plies.

After the assembled shells have thus been covered, the side walls of the outer shell, together with the corresponding portions of the wrapper are severed by a suitable tool, such for instance as a rotating knife, the severing taking place on a plane intermediate the planes of the top and bottom walls of the box, this severing action providing the neck or shoulder structure through the fact that the side walls of the inner shell remain intact, while the side walls of the outer shell are severed into two parts, one of which remains integral with the top wall and forms the depending flange configuration of the cover, the remainder of the side walls of this shell forming the outer ply of the double ply portion of the side wall of the box.

The character of the box to be produced determines the number of sides which are severed in this manner. If the cover is of the removable type, all of the side walls of the outer shell are severed. If the box is to be of the form in which the cover is hinged, the wall which forms the hinge of the box remains unsevered and is, as heretofore explained, scored to provide for the hinge action, this portion of the wrapper blank obviously being unsevered and thus forming an integral connection between the top and bottom walls of the box extending over the face of the hinge wall.

As heretofore pointed out, the box blank for the outer shell may be scored for the purpose of aiding in this severing operation.

This arrangement practically changes the means for retaining the two plies of the side walls against relative movement from the direct adhesive connection between the plies—the universal practice heretofore employed in this type of boxes—to the connection between the exposed side wall and the bottom of the box, the latter carrying the other ply and thus retaining the two plies against relative movement without any adhesive connection between the two plies.

This possibility of providing the efficient retention of the two plies against movement, enables the box formation to be produced on standard machines—machines adapted for other purposes. For instance, the shell production may be provided on machines adapted for the formation of shells. The subsequent procedure may vary according to the type of the machine. For instance, the shells may be assembled and the wrapper applied by machines adapted for wrapping packages with a tight wrapper, or machines may be employed in which the shells are assembled concurrently with the application of the tight wrapper, this being another type of standard machine. In either case, the formation of the box of the present invention is of such character as will permit its production on these different machines, so that the necessity for large capital outlays for special machines usable only in the production of this type of boxes is eliminated. Hence manufacturers equipped for the production of other types of boxes are able to produce boxes of this particular type under large capacity conditions and are therefore able to enter this particular field and under competitive conditions without risking large capital outlays in preparing to enter the field.

To these and other ends, therefore, the nature of which will be readily understood, said invention consists in the improved box construction and methods of producing the same all as hereinafter fully described, illustrated in the accompanying drawings, and more particularly pointed out in the appended claims.

In the accompanying drawings, in which similar reference characters indicate similar parts in each of the views.

Figs. 7 and 7ª are detail sectional views of the inner shell showing ways in which the shell may be covered.

Figs. 8 and 8ª are similar views showing the outer shell in telescoping relation to the inner shell arrangement of Figs. 7 and 7ª.

Figs. 9 and 9ª are detail sectional views of the structures of Figs. 8 and 8ª and showing wrapper blanks applied to the assembled shells.

Fig. 10 is a sectional view of a box showing the manner in which the severing operation may be provided.

Figure 1:
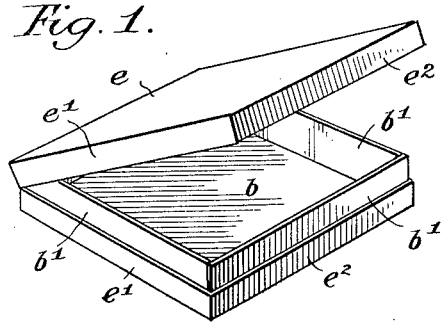
Figure 1 is a perspective view of a box constructed in accordance with the present invention, the box being of the hinge form.
Figure 2:
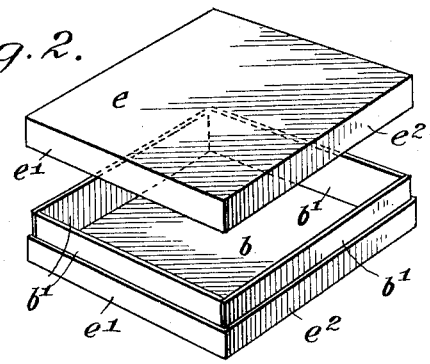
Fig. 2 is a similar view, showing the box as of the removable cover form.
Figure 3:
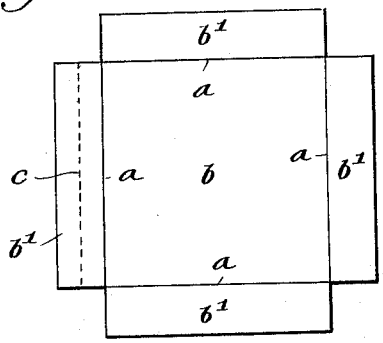
Fig. 3 is a plan view of one form of blank which may be employed in the production of the shells.

The invention is applicable for use in connection with boxes of various configurations, the drawings showing a square configuration for illustrative purposes. With such configuration, a blank of the type shown in Fig. 3 may be employed as the shell blank, the lines $a$ indicating score lines to permit ready folding of the wings into position to form side walls of the shell, the plane wall of the shell being indicated at $b$, and the wings at $b'$. Where the box is of the removable cover type, both blanks may be of similar type, that for the outer shell being formed sufficiently larger to provide for telescoping of the two shells. Where the box is of the hinge form, one of the wings $b'$ of the outer shell is scored as at $c$ to provide for the hinging action. For the purpose of aiding the severing operation presently referred to, the outer shell blank may be additionally scored, as at $d$ in Fig. 4, this figure showing the score lines on each of the wings. Where the blank is employed with a removable cover box, each of the side walls will be severed on the line $d$. Where the box is of the hinge type, the score line $d$ of one of the wings will serve the function of the score line $c$, it being understood, of course, that score lines $a$ are located on to the opposite side of the blank from the score lines $c$ or $d$. As heretofore pointed out, score lines $d$ may be entirely omitted, not being absolutely essential but forming an aid in the severing operation presently described.

Either or both of the shells may be constructed as a stayed or an unstayed shell, or either or both may be stripped. However, I prefer to strip or stay the inner shell, although this may be omitted when this shell is provided with an individual covering or wrapping by the use of a blank such as shown for instance in Fig. 6, this blank being adapted to support the box blank in its shell formation without the use of staying or stripping structures.

In connection with the outer shell, this staying or stripping is not vitally important, since the wrapping blank is adapted to provide the necessary action as in the general unstayed box shell structure, so that the outer shell may be stayed or unstayed as may be found desirable irrespective of the particular formation which the inner shell may have in this respect.

Figure 6:
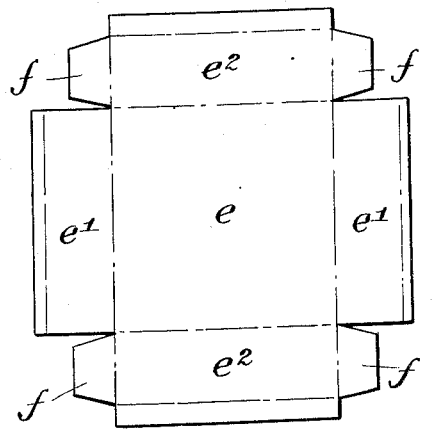
Fig. 6 is a plan view of a wrapper blank which is adapted for wrapping the inner shell and which may be employed in the wrapping of the box.

For purposes of explanation, it may be noted that this staying action of the blank of Fig. 6 is had by the use of end laps $f$ carried by predetermined wings $e^2$ of the blank, these wings being carried by the body portion $e$ of the blank—which is adapted to extend over a plane wall of the box—the remaining wings also being attached to the body portion of the blank. When this blank is applied, wings $e^2$ are applied to the corresponding wings of the shell blank, and the end laps $f$ adhesively secured to the adjacent wings of the shell blank, thus carrying the material of a wing on to adjacent side walls of the shell. After the laps are applied the wings $e'$ are secured in position, these wings overlying the applied end laps.

This blank of Fig. 6, when employed as an individual wrapper for the inner shell, is applied with the main portion $e$ adhesively connected to the plane wall $b$ of the blank, this wall forming the bottom of the box, the wings of the wrapping blank being applied to the wings of the box blank, the excess width of the wings being turned over the marginal edge of the upstanding wings of the shell and applied to the inner side of the shell, as is usual in connection with the wrapping of shells. This blank may also be employed as the wrapping blank for the assembled shells in which case the main portion $e$ is applied to the plane wall $b$ of the outer section—the top of the box—the wings of the wrapper extending over the side walls of the box, the excess width of the wings being applied to the plane wall of the inner section—in other words to the bottom of the box—the wrapper blank thus integrally connecting the top and bottom walls of the box through the wings which are adhesively connected to the exposed side walls of the box.

The use of the wrapper blank of Fig. 6 is not compulsory for either purpose, its use with the individual shell being mainly for the purpose of providing a finish to the inner shell, the upper portion of the side walls of which are exposed above the shoulder and form the neck of the box. Obviously, where a neatly finished box is not required, this blank may be omitted. Or, if desired, the finished appearance of the neck may be provided by stripping the inner shell in the usual manner, such arrangement leaving the major portion of the box bottom uncovered except such covering as may be provided during the application of the outer wrapping. When this blank is employed as the outer wrapping, the excess width of the wings is insufficient to entirely cover the bottom of the box, so that the latter would remain uncovered. This fact, however, does not materially affect the box formation so far as retaining the two plies of the side walls against relative movement, since it provides a continuous connection between the bottom wall and an adjacent exposed side wall of the finished box.

Figure 5:
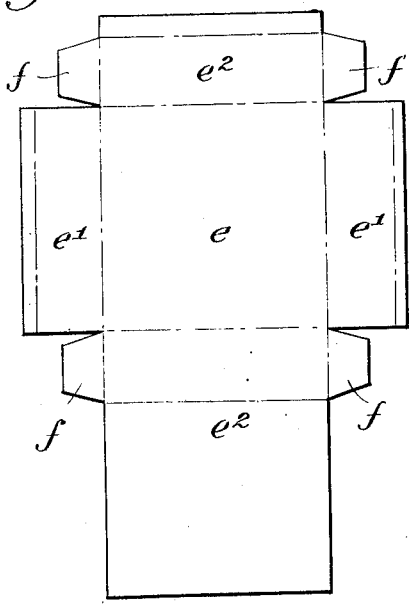
Fig. 5 is a plan view of one form of wrapper blank which may be employed in the production of the box.

The box can be given a more finished appearance by completely covering the bottom, and this may be provided by the use of the blank of Fig. 5 as the outer wrapping blank, this blank having one of the wings $e^2$ increased sufficiently in width to provide the material to substantially overlie the bottom wall of the box including excess portions of the remaining wings which have been applied directly to the bottom. This use of the extension permits opposite and adjacent applied wing portions to be connected by the extension.

As will be seen, the shells are of complemental contour and are preferably, although not essentially, of relative depths so that the marginal edges of the inner shell will contact with the under face of the top wall of the outer shell when the two shells are assembled, it being understood that the telescoping shells are assembled in inverted relation.

In Figs. 7 to 9 inclusive, I have shown successive stages of the operation where a blank of the type of Fig. 6 is employed as a covering blank for the inner shell, and a blank of the type of Fig. 5 is employed as the cover for the assembled shells, Fig. 7 showing the application of the wrapper to the inner box shell, Fig. 8 showing the positioning of the outer shell thereon, and Fig. 9 showing the application of the inclosing wrapper to the assembled shells. Figs. 7$^a$ to 9$^a$ show similar steps where the inner shell is stripped instead of employing the wrapping shown in Fig. 6.

Figure 4:
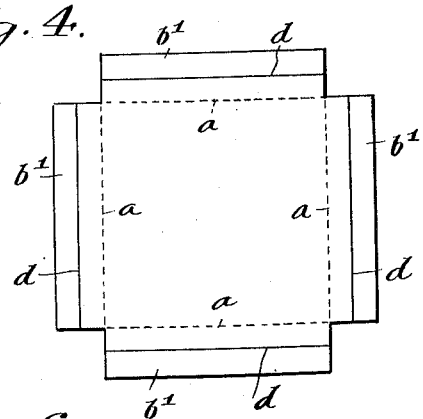
Fig. 4 is a similar view showing a blank scored to aid in the severing operation.

As will be understood, the application of the inclosing wrapper—the wrapper of either of Figs. 5 or 6—provides practically a tight wrapping more or less accurately fitting the exterior walls of the assembled shells and uniting the shells in such manner that the two plies of the side walls are held from movement relative to each other to an extent sufficient to provide for all ordinary uses it being understood, of course, that in use the contents of the box is, by reason of the particular construction, located entirely within the inner shell which is formed from a one-piece blank.

Where the blank of Fig. 4 forms the outer shell, it will be readily understood that when the two shells are assembled, the scoring lines $d$ are located on the inner side of the shell. When, therefore, the wrapped assembly is subjected to the action of a suitable cutting tool, such for instance as the tool $g$ in Fig. 10, the cutting edge of the latter need not penetrate the shell the full distance of the thickness of the shell wall and its wrapping, thus reducing the possibility of damaging the wrapped or stripped surface of the inner shell. However, these scoring lines $d$ may be omitted, provision being made—as by the use of suitable guides or gages—for regulating the depth of the cutting tool, thus limiting the penetration of the tool to an extent sufficient to prevent material damage in this respect. In each case, however, severing of the outer shell, as indicated, provides a collar-like portion thereof which surrounds the lower portion of the inner shell, this portion being maintained against movement relative to the inner shell by means of the adhesively attached portions of the cover blank which overlie the side walls of the outer shell and that wall of the inner shell which constitutes the bottom of the finished box.

As will be understood, the production of the two forms of boxes indicated is substantially similar, the difference between the two being that in the hinge type the side wall severing operation is omitted with respect to that side wall which is to form the hinge wall of the box, the inclosing wrapper forming an adhesively connected reinforcement to the box blank on the hinge line.

As will be understood, the application of the inclosing wrapper is made on the assembled shells at which time the outer ply of the double ply portion of the box body is still an integral part of the outer shell. Hence the inclosing wrapper can be applied to provide a smooth and tight adhesive connection with the exposed walls of the assembled shell, insuring proper application of the wrapper to provide the most efficient service in the completed box. And since the subsequent severing action does not change this condition, the completed box retains the efficiency responsive to the wrapping operation.

As will be understood, of course, the box may have various configurations, the several blanks being arranged accordingly, the present invention not being particularly limited with respect to the particular box configuration.

By the changed methods of constructing the box disclosed herein, the manufacture of boxes of this type is brought into the general field of box manufacture instead of the more or less restricted field of the specialized manufacturer.

While I have herein shown and described a general type of box and ways in which it may be produced, it will be understood that variations and modifications therein may be required or desired to meet the exigencies of use, and I desire to be understood as reserving the right to make any and all such changes as may be necessary in so far as the same may fall within the spirit and scope of the invention as expressed in the accompanying claims.

Having thus described my invention, what I claim as new, is:

1. The method of making a box of the neck or shoulder type which consists in producing complemental box shells from blanks each adapted to produce a plane wall and side walls extending laterally of the plane wall and with the side walls free from adhesive, assembling the shells in inverted and telescoping relation to locate the plane walls as top and bottom walls of the box with the exposed side walls integral with the top wall to provide a two-ply side wall structure with the plies unconnected, applying a wrapper blank to walls of the box with wrapper portions adhesively applied to side walls and extending on to the top and bottom walls to provide an integral wrapping connecting the top and bottom walls and with adhesive connection with an intervening side wall, and then severing side walls of the shell carrying the top wall and the wrapper covering thereof intermediate the planes of the top and bottom walls.

2. The method of forming a necked box which consists in producing complemental box shells having side walls free from adhesive, assembling said shells in telescoped relation, adhesively applying a wrapper to the outer surface of the assembled shells, and then severing the wrapper and predetermined side walls of the outer shell.

3. The method of forming a necked box which consists in producing complemental box shells, assembling said shells in telescoped relation, adhesively applying a wrapper to the outer surface of the assembled shells and across the junction between the inner shell and the edges of the outer shell to connect said edges to the inner shell, and then severing the wrapper and predetermined side walls of the outer shell.

4. The method of forming a necked box which consists in producing complemental box shells having side walls, assembling said shells in telescoped relation, adhesively applying a wrapper to the outer surface of the assembled shells, covering the entire outer surface of the outer shell and extending across the junction of the side wall edges of the outer shell into adhesive engagement with the bottom portion of the inner shell to connect the side walls of the outer shell to the inner shell throughout substantially the entire length of the junction between the edges of said side walls and the inner shell, and then severing the wrapper and predetermined side walls of the outer shell to produce a necked box.

In testimony whereof I have hereunto set my hand.

JOHN STOGDELL STOKES.